(12) United States Patent
Zhao et al.

(10) Patent No.: US 11,833,559 B2
(45) Date of Patent: Dec. 5, 2023

(54) TRANSVERSE VIBRATION ROLLING SYSTEM AND PREPARATION METHOD FOR DOUBLE-LAYER METAL COMPOSITE ULTRA-THIN STRIP

(71) Applicant: TAIYUAN UNIVERSITY OF TECHNOLOGY, Shanxi (CN)

(72) Inventors: Jingwei Zhao, Shanxi (CN); Tao Wang, Shanxi (CN); Linan Ma, Shanxi (CN); Jianchao Han, Shanxi (CN); Yuanming Liu, Shanxi (CN); Zhongkai Ren, Shanxi (CN); Qingxue Huang, Shanxi (CN)

(73) Assignee: TAIYUAN UNIVERSITY OF TECHNOLOGY, Shanxi (CN)

( * ) Notice: Subject to any disclaimer, the term of this patent is extended or adjusted under 35 U.S.C. 154(b) by 296 days.

(21) Appl. No.: 17/410,794

(22) Filed: Aug. 24, 2021

(65) Prior Publication Data
US 2021/0379634 A1   Dec. 9, 2021

Related U.S. Application Data

(63) Continuation of application No. PCT/CN2020/081908, filed on Mar. 28, 2020.

(30) Foreign Application Priority Data

Mar. 13, 2020   (CN) .......................... 202010176981.0

(51) Int. Cl.
*B21B 13/02*   (2006.01)
*B21B 1/22*    (2006.01)
(Continued)

(52) U.S. Cl.
CPC ................ *B21B 13/02* (2013.01); *B21B 1/22* (2013.01); *B23K 11/11* (2013.01); *B23K 11/34* (2013.01); *B21B 2013/021* (2013.01)

(58) Field of Classification Search
CPC ......... B21B 13/02; B23K 11/11; B23K 11/34; B23K 11/00
See application file for complete search history.

(56) References Cited

FOREIGN PATENT DOCUMENTS

| CN | 104438323 A | * | 3/2015 | ............... B21B 1/38 |
| CN | 209918557 U | * | 1/2020 | |

OTHER PUBLICATIONS

English translation CN 209918557 (Year: 2020).*
CN 104438323 English translation (Year: 2015).*

* cited by examiner

*Primary Examiner* — Jason L Vaughan
*Assistant Examiner* — Amanda Kreiling

(57) ABSTRACT

A transverse vibration rolling system and a preparation method for a double-layer metal composite ultra-thin strip relate to a technical field of rolling, which solve problems including poor rolling and bonding effects, low geometric accuracy, and poor plate shape quality of metal composite ultra-thin strips. The transverse vibration rolling system includes: a first roll, a second roll, a first hydraulic vibrator, a second hydraulic vibrator, a first hydraulic motor, a second hydraulic motor, a check valve, a first hydraulic pump, a first overflow valve, an oil tank, a controller, a second overflow valve, a second hydraulic pump, an electromagnetic reversing valve, a first speed control valve, and a second speed control valve. The transverse vibration of the rolls of the present invention can apply transverse shearing force on the ultra-thin metal strips during the bond rolling.

8 Claims, 1 Drawing Sheet

(51) Int. Cl.
*B23K 11/34* (2006.01)
*B23K 11/11* (2006.01)

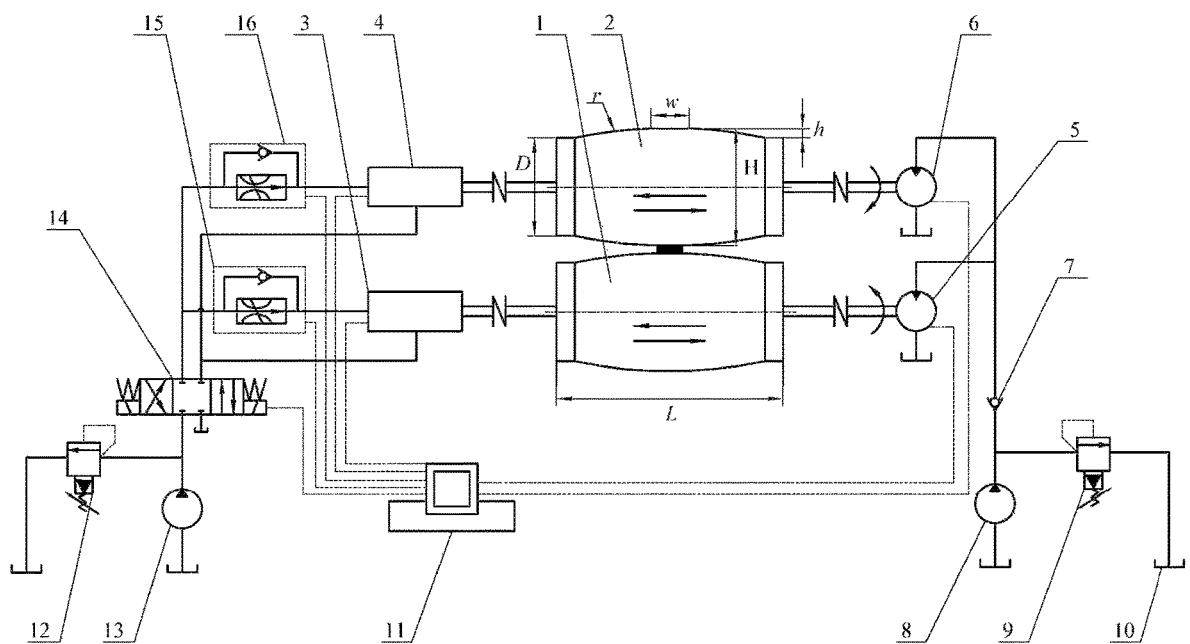

TRANSVERSE VIBRATION ROLLING SYSTEM AND PREPARATION METHOD FOR DOUBLE-LAYER METAL COMPOSITE ULTRA-THIN STRIP

CROSS REFERENCE OF RELATED APPLICATION

The application is a continuation application of a PCT application No. PCT/CN2020/081908, filed on Mar. 28, 2020; and claims the priority of Chinese Patent Application No. CN202010176981.0, filed to the China National Intellectual Property Administration (CNIPA) on Mar. 13, 2020, the entire content of which are incorporated hereby by reference.

BACKGROUND OF THE PRESENT INVENTION

Field of Invention

The present invention relates to a technical field of rolling, and more particularly to a transverse vibration rolling system and a preparation method for a double-layer metal composite ultra-thin strip.

Description of Related Arts

Metal composite material is a general term for composite materials which use metal as the matrix and adopt composite technology to achieve metallurgical bonding with another or several reinforcement metals with different physical, chemical and mechanical properties at the interfaces. The metal composite material takes advantages of each component and makes up for the deficiencies of each component, so as to provide excellent comprehensive properties that a single metal or alloy cannot match.

The layered structure is the most basic and most extensive composition structure of natural structural materials. Through hierarchical control and step-by-step optimization, the layered structure material can have unique strengthening-toughening matching advantages and excellent mechanical properties. Layered metal composite materials compensate for the inherent performance of the material in each layer by optimizing the composition and structure of the layers, and exhibit excellent comprehensive performance, so as to be widely used in aerospace, transportation, infrastructure, electronic communications and other fields.

During rolling of ultra-thin metal strips, the rolls are prone to elastic deformation due to the large rolling force. As the thickness of the ultra-thin metal strip decreases, the rolling force must increase. Furthermore, because of the springback phenomenon of the ultra-thin metal strip, the geometric accuracy of the final product cannot be guaranteed. Especially, when the thickness of the ultra-thin strip is reduced to a certain range, the edges of the upper and lower rolls, which are not covered by the ultra-thin metal strip, will contact each other. It significantly affects the rolling and bonding effects of the ultra-thin strip as well as the plate shape quality of the final product.

SUMMARY OF THE PRESENT INVENTION

To solve problems including poor rolling and bonding effects, low geometric accuracy, and poor plate shape quality of metal composite ultra-thin strips, an object of the present invention is to provide a transverse vibration rolling system and a preparation method for a double-layer metal composite ultra-thin strip. Accordingly, in order to solve the above technical problems, the present invention provides:

a transverse vibration rolling system for a double-layer metal composite ultra-thin strip, comprising: a first roll, a second roll, a first hydraulic vibrator, a second hydraulic vibrator, a first hydraulic motor, a second hydraulic motor, a check valve, a first hydraulic pump, a first overflow valve, an oil tank, a controller, a second overflow valve, a second hydraulic pump, an electromagnetic reversing valve, a first speed control valve, and a second speed control valve; wherein the first roll and the second roll have a cylindrical structure protruding from a middle part; hydraulic oil in the oil tank is pumped out by the first hydraulic pump, wherein a part of the hydraulic oil flows back to the oil tank after being regulated by the first overflow valve which controls an oil pressure, and the other part of the hydraulic oil pumped by the first hydraulic pump enters the first hydraulic motor and the second hydraulic motor through the check valve; the hydraulic oil in the oil tank is also pumped out by the second hydraulic pump, wherein a part of the hydraulic oil flows back to the oil tank through the second overflow valve which control the oil pressure, and the other part of the hydraulic oil pumped by the second hydraulic pump enters the first hydraulic vibrator and the second hydraulic vibrator after passing through the electromagnetic reversing valve as well as the first speed control valve and the second speed control valve; the first hydraulic motor and the second hydraulic motor are connected to one end of the first roll and one end of the second roll respectively through couplings, so as to facilitate rotation of the first roll and the second roll; the first hydraulic vibrator and the second hydraulic vibrator are connected to the other end of the first roll and the other end of the second roll respectively through couplings, so as to drive the first roll and the second roll to vibrate laterally; the controller uses electric signals to control rotation speeds of the first hydraulic motor and the second hydraulic motor, vibration frequencies of the first hydraulic vibrator and the second hydraulic vibrator, reversing of the electromagnetic reversing valve, and flow rates of the first speed control valve and the second speed control valve, thereby coordinating movements of the whole system; oil outlets of the first hydraulic motor, the second hydraulic motor and the first hydraulic pump are all connected to the oil tank to realize oil return; oil return ports of the first hydraulic vibrator and the second hydraulic vibrator are both connected to the electromagnetic reversing valve to realize oil return. The hydraulic vibrators and the hydraulic motors are connected with the controller to monitor and set the transverse vibration frequency, amplitude, and motor-driven roll speed.

Preferably, the first roll and the second roll are both made of tungsten carbide cemented carbide with high strength, high hardness and high Young's modulus. The cemented carbide can reduce the elasticity and bending deformation of the roll during rolling, thereby avoiding contact between roll edges not covered by the ultra-thin metal strip.

Preferably, both the first roll and the second roll have step planes protruding outwards, and the step planes are connected to cylindrical roll body planes at both ends through arc surfaces; a step plane height h=0.5-2 mm, a cylindrical roll diameter D=20-40 mm, and a roll body length L of the first roll and the second roll=25-50 mm. The height of the steps of the first roll and the second roll are kept the same, and the transitional connection between the step planes and the roll bodies prevents the stress concentration from damaging the steps during rolling.

Preferably, a step plane width w is greater than a width of an ultra-thin metal strip. The first roll and the second roll produce transverse periodic vibration during rolling. Therefore, the width of the ultra-thin strip will increase during rolling, and the steps must be wide enough to ensure the stability of the rolling process.

The present invention also provides a preparation method for a double-layer metal composite ultra-thin strip, comprising steps of:

1) soaking two ultra-thin metal strips in an acetone solution, and cleaning the two ultra-thin metal strips with an ultrasonic cleaner;
2) washing surfaces of the two ultra-thin metal strips obtained in the step 1) with absolute ethanol;
3) stacking the two ultra-thin metal strips obtained in the step 2), and welding edges of the two ultra-thin metal strips together through spot welding to avoid relative sliding during rolling;
4) sending the two ultra-thin metal strips stacked in the step 3) into a transverse vibration rolling system for first pass of bond rolling; and
5) repeating the step 4), and performing multiple-pass rolling with a pass reduction of 15%-35% until the two ultra-thin metal strips are metallurgically bonded at interfaces, thereby obtaining the double-layer metal composite ultra-thin strip.

Preferably, thicknesses of the ultra-thin metal strips in the step 1) are at a range of 20-200 μm, and the thicknesses of the two ultra-thin metal strips before rolling are the same or different.

Preferably, the reduction of the first pass of bond rolling in the step 4) is greater than 40%, realizing preliminary bonding of the ultra-thin metal strips.

Preferably, the ultra-thin metal strips are made of stainless steel, or pure metal of titanium, copper, or aluminum, or titanium alloy, or copper alloy, or aluminum alloy; materials of the two ultra-thin metal strips before bond rolling are the same or different.

Compared with the prior art, beneficial effects of the present invention are as follows.

(1) The transverse vibration of the rolls of the present invention can apply transverse shearing force on the ultra-thin metal strips during the bond rolling. The ultra-thin metal strip produces widening while extending longitudinally, thereby reducing the anisotropy of the ultra-thin metal strip and significantly improve the bonding strength of rolled products.

(2) The rolls of the present invention adopt the tungsten carbide material with high strength, high hardness and high Young's modulus, and have the step planes with a certain convexity in the middle parts of the rolls. This design can reduce the elasticity and bending deformation of the rolls during rolling, thereby avoiding contact between the roll edges during rolling, and effectively improving the shape of the ultra-thin metal strip and the accuracy of the final products.

BRIEF DESCRIPTION OF THE DRAWINGS

FIGURE is a schematic diagram of the present invention. Element reference: 1—first roll, 2—second roll, 3—first hydraulic vibrator, 4—second hydraulic vibrator, 5—first hydraulic motor, 6—second hydraulic motor, 7—check valve, 8—first hydraulic pump, 9—first overflow valve, 10—oil tank, 11—controller, 12—second overflow valve, 13—second hydraulic pump, 14—electromagnetic reversing valve, 15—first speed control valve, 16—second speed control valve.

DETAILED DESCRIPTION OF THE PREFERRED EMBODIMENT

The technical solutions in the embodiments of the present invention will be described clearly and completely below with reference to the accompanying drawings. Obviously, the described embodiments are only a part of all the embodiments of the present invention, rather than all the embodiments.

Embodiment 1

Referring to the FIGURE, a transverse vibration rolling system for a double-layer metal composite ultra-thin strip is provided, comprising: a first roll 1, a second roll 2, a first hydraulic vibrator 3, a second hydraulic vibrator 4, a first hydraulic motor 5, a second hydraulic motor 6, a check valve 7, a first hydraulic pump 8, a first overflow valve 9, an oil tank 10, a controller 11, a second overflow valve 12, a second hydraulic pump 13, an electromagnetic reversing valve 14, a first speed control valve 15, and a second speed control valve 16. The first roll 1 and the second roll 2 are both made of tungsten carbide cemented carbide with high strength, high hardness and high Young's modulus. Both the first roll 1 and the second roll 2 have step planes protruding outwards, and the step planes are connected to cylindrical roll body planes at both ends through arc surfaces. A step plane width w is greater than a width of an ultra-thin metal strip. Hydraulic oil in the oil tank 10 is pumped out by the first hydraulic pump 8 through the first overflow valve 9 which controls an oil pressure, the hydraulic oil pumped by the first hydraulic pump 8 enters the first hydraulic motor 5 and the second hydraulic motor 6 through the check valve 7; the hydraulic oil in the oil tank 10 is also pumped out by the second hydraulic pump 13 through the second overflow valve 12 which control the oil pressure, and the hydraulic oil pumped by the second hydraulic pump 13 enters the first hydraulic vibrator 3 and the second hydraulic vibrator 4 after passing through the electromagnetic reversing valve 14 as well as the first speed control valve 15 and the second speed control valve 16; the first hydraulic motor 5 and the second hydraulic motor 6 are connected to one end of the first roll 1 and one end of the second roll 2 respectively through couplings, so as to facilitate rotation of the first roll 1 and the second roll 2; the first hydraulic vibrator 3 and the second hydraulic vibrator 4 are connected to the other end of the first roll 1 and the other end of the second roll 2 respectively through couplings, so as to drive the first roll 1 and the second roll 2 to vibrate laterally; the controller 11 uses electric signals to control rotation speeds of the first hydraulic motor 5 and the second hydraulic motor 6, vibration frequencies of the first hydraulic vibrator 3 and the second hydraulic vibrator 4, reversing of the electromagnetic reversing valve 14, and flow rates of the first speed control valve 15 and the second speed control valve 16, thereby coordinating movements of the whole system; oil outlets of the first hydraulic motor 5, the second hydraulic motor 6 and the first hydraulic pump 8 are all connected to the oil tank 10 to realize oil return; oil return ports of the first hydraulic vibrator 3 and the second hydraulic vibrator 4 are both connected to the electromagnetic reversing valve 14 to realize oil return.

According to the embodiment 1, a step plane height h=0.5-2 mm, a cylindrical roll diameter D=20-40 mm, and a roll body length L of the first roll (1) and the second roll (2)=25-50 mm.

Embodiment 2

A preparation method for a double-layer metal composite ultra-thin strip is provided, comprising steps of:
1) soaking two ultra-thin metal strips in an acetone solution, and cleaning the two ultra-thin metal strips with an ultrasonic cleaner;
2) washing surfaces of the two ultra-thin metal strips obtained in the step 1) with absolute ethanol, wherein thicknesses of the ultra-thin metal strips in the step 1) are 20-200 μm;
3) stacking the two ultra-thin metal strips obtained in the step 2), and welding edges of the two ultra-thin metal strips together through spot welding to avoiding relative sliding during rolling;
4) sending the two ultra-thin metal strips stacked in the step 3) into a transverse vibration rolling system for first bond rolling; a reduction of the first pass of bond rolling is greater than 40%; and
5) repeating the step 4), and performing multiple-pass rolling with a pass reduction of 15%-35% until the two ultra-thin metal strips are metallurgically bonded at interfaces, thereby obtaining the double-layer metal composite ultra-thin strip.

In the embodiment 2, the ultra-thin metal strips are made of stainless steel, or pure metal of titanium, copper, or aluminum, or titanium alloy, or copper alloy, or aluminum alloy; materials of the two ultra-thin metal strips before rolling are the same or different.

What is claimed is:

1. A transverse vibration rolling system for a double-layer metal composite ultra-thin strip, comprising: a first roll (1), a second roll (2), a first hydraulic vibrator (3), a second hydraulic vibrator (4), a first hydraulic motor (5), a second hydraulic motor (6), a check valve (7), a first hydraulic pump (8), a first overflow valve (9), an oil tank (10), a controller (11), a second overflow valve (12), a second hydraulic pump (13), an electromagnetic reversing valve (14), a first speed control valve (15), and a second speed control valve (16); wherein the first roll (1) and the second roll (2) have a cylindrical structure protruding from a middle part; hydraulic oil in the oil tank (10) is pumped out by the first hydraulic pump (8), wherein a part of the hydraulic oil flows back to the oil tank (10) after being regulated by the first overflow valve (9) which controls an oil pressure, and the other part of the hydraulic oil pumped by the first hydraulic pump (8) enters the first hydraulic motor (5) and the second hydraulic motor (6) through the check valve (7); the hydraulic oil in the oil tank (10) is also pumped out by the second hydraulic pump (13), wherein a part of the hydraulic oil flows back to the oil tank (10) through the second overflow valve (12) which control the oil pressure, and the other part of the hydraulic oil pumped by the second hydraulic pump (13) enters the first hydraulic vibrator (3) and the second hydraulic vibrator (4) after passing through the electromagnetic reversing valve (14) as well as the first speed control valve (15) and the second speed control valve (16); the first hydraulic motor (5) and the second hydraulic motor (6) are connected to one end of the first roll (1) and one end of the second roll (2) respectively through couplings, so as to facilitate rotation of the first roll (1) and the second roll (2); the first hydraulic vibrator (3) and the second hydraulic vibrator (4) are connected to the other end of the first roll (1) and the other end of the second roll (2) respectively through couplings, so as to drive the first roll (1) and the second roll (2) to vibrate laterally; the controller (11) uses electric signals to control rotation speeds of the first hydraulic motor (5) and the second hydraulic motor (6), vibration frequencies of the first hydraulic vibrator (3) and the second hydraulic vibrator (4), reversing of the electromagnetic reversing valve (14), and flow rates of the first speed control valve (15) and the second speed control valve (16), thereby coordinating movements of the whole system; oil outlets of the first hydraulic motor (5), the second hydraulic motor (6) and the first hydraulic pump (8) are all connected to the oil tank (10) to realize oil return; oil return ports of the first hydraulic vibrator (3) and the second hydraulic vibrator (4) are both connected to the electromagnetic reversing valve (14) to realize oil return.

2. The transverse vibration rolling system for the double-layer metal composite ultra-thin strip, as recited in claim 1, wherein the first roll (1) and the second roll (2) are both made of tungsten carbide cemented carbide with high strength, high hardness and high Young's modulus.

3. The transverse vibration rolling system for the double-layer metal composite ultra-thin strip, as recited in claim 1, wherein both the first roll (1) and the second roll (2) have step planes protruding outwards, and the step planes are connected to cylindrical roll body planes at both ends through arc surfaces; a step plane height h=0.5-2 mm, a cylindrical roll diameter D=20-40 mm, and a roll body length L of the first roll (1) and the second roll (2)=25-50 mm.

4. The transverse vibration rolling system for the double-layer metal composite ultra-thin strip, as recited in claim 3, wherein a step plane width w is greater than a width of an ultra-thin metal strip.

5. A preparation method for a double-layer metal composite ultra-thin strip, comprising steps of:
1) soaking two ultra-thin metal strips in an acetone solution, and cleaning the two ultra-thin metal strips with an ultrasonic cleaner;
2) washing surfaces of the two ultra-thin metal strips obtained in the step 1) with absolute ethanol;
3) stacking the two ultra-thin metal strips obtained in the step 2), and welding edges of the two ultra-thin metal strips together through spot welding to avoid relative sliding during rolling;
4) sending the two ultra-thin metal strips stacked in the step 3) into a transverse vibration rolling system for first pass of bond rolling; and
5) repeating the step 4), and performing multiple-pass rolling with a pass reduction of 15%-35% until the two ultra-thin metal strips are metallurgically bonded at interfaces, thereby obtaining the double-layer metal composite ultra-thin strip.

6. The preparation method, as recited in claim 5, wherein thicknesses of the ultra-thin metal strips in the step 1) are at a range of 20-200 μm, and the thicknesses of the two ultra-thin metal strips before rolling are the same or different.

7. The preparation method, as recited in claim 5, wherein the reduction of the first pass of bond rolling in the step 4) is greater than 40%.

8. The preparation method, as recited in claim 5, wherein the ultra-thin metal strips are made of stainless steel, or pure metal of titanium, copper, or aluminum, or titanium alloy, or copper alloy, or aluminum alloy; materials of the two ultra-thin metal strips before bond rolling are the same or different.

* * * * *